United States Patent
Voris et al.

(10) Patent No.: US 9,188,840 B1
(45) Date of Patent: *Nov. 17, 2015

(54) MANNEQUIN STUDIO

(71) Applicant: ThredUp, Inc., San Francisco, CA (US)

(72) Inventors: John Hugh Voris, Los Gatos, CA (US);
Michael Santhanam, Newark, CA (US);
Vivek Daver, San Ramon, CA (US);
Gregory John Ward, Berkeley, CA (US)

(73) Assignee: ThredUp, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,573

(22) Filed: Jul. 20, 2015

Related U.S. Application Data

(63) Continuation of application No. 14/669,529, filed on Mar. 26, 2015, now Pat. No. 9,122,128.

(51) Int. Cl.
 G03B 15/07 (2006.01)

(52) U.S. Cl.
 CPC .................................... G03B 15/07 (2013.01)

(58) Field of Classification Search
 CPC ................................ G03B 15/07; G03B 15/06
 See application file for complete search history.

(56) References Cited

U.S. PATENT DOCUMENTS

| | | | |
|---|---|---|---|
| 1,136,170 A | 4/1915 | Rubin | |
| 2,147,030 A | 2/1939 | Haskin | |
| 4,236,795 A | 12/1980 | Kephart | |
| 7,039,486 B2 | 5/2006 | Wang | |
| 7,177,537 B1 | 2/2007 | Adolphi et al. | |
| 8,676,045 B1 | 3/2014 | Sawatzky et al. | |
| 2005/0234782 A1 | 10/2005 | Schackne et al. | |
| 2010/0150432 A1 | 6/2010 | Zilli | |
| 2011/0096183 A1 | 4/2011 | Robertson | |
| 2014/0198250 A1 | 7/2014 | Delzell | |

FOREIGN PATENT DOCUMENTS

WO     WO 01/63354 A1 *   8/2001  ............. G03B 15/00

OTHER PUBLICATIONS

"Northlight Images," accessed on the internet at http://www.northlight-images.co.uk/product_photo_training.html; downloaded Mar. 25, 2015; 3pgs.

(Continued)

*Primary Examiner* — W B Perkey
(74) *Attorney, Agent, or Firm* — Goodwin Procter LLP

(57) ABSTRACT

A studio arrangement including a plurality of paths having a common termination point wherein none of the paths are parallel to another, a plurality of mannequins each comprising a conveyance that is slidably engaged with a different one of the paths such that each mannequin can slide along the path to the termination point, a background comprising a white surface, the background located behind the termination point, an image capture device located at a first position on an axis that intersects a mannequin at a second position when the mannequin is positioned at the termination point, and one or more light sources each aimed at the background and positioned in front of the termination point.

10 Claims, 12 Drawing Sheets

(56) References Cited

OTHER PUBLICATIONS

"Perfect Light Setup for Photographing Clothes on a Mannequin on White Background," accessed on the internet at http://www.doanalyze.com/perfect-light-setup-for-photographing-clothes-on-a-mannequin-on-white-background/; downloaded Mar. 25, 2015; 18pgs.

U.S. Appl. No. 14/669,465, filed Mar. 26, 2015, Systems and Methods for Merchandising, Voris et al.

U.S. Appl. No. 14/669,468, filed Mar. 26, 2015, Systems and Methods for Photographing Merchandise, Voris et al.

U.S. Appl. No. 14/669,529, filed Mar. 26, 2015, Mannequin Studio, Voris et al.

\* cited by examiner

MANNEQUIN STUDIO

CROSS REFERENCE TO RELATED APPLICATIONS

This application is a continuation of, and claims priority to, pending U.S. patent application Ser. No. 14/669,529, filed on Mar. 26, 2015, entitled "Mannequin Studio," the disclosure of which is incorporated herein by reference in its entirety.

BACKGROUND

This specification relates to merchandising technology and, more particularly, cataloging clothing items.

Merchandising products to retail customers can include activities in selecting, pricing, and cataloging products, and displaying products in physical or online retail storefronts. Online shopping is a form of electronic commerce which allows consumers to directly buy goods or services from a seller over the Internet using a web browser or other application. An online shop can evoke the physical analogy of buying products or services at a bricks-and-mortar retailer or shopping center.

SUMMARY

In general, one aspect of the subject matter described in this specification can be embodied in a studio arrangement comprising a plurality of article transports, each article transport having a respective machine-readable code for tracking an article, an image capture device located at a first position on an axis wherein the image capture device is configured to capture images of articles placed on a surface wherein the axis intersects the surface at a second position, one or more light sources each positioned along a respective second axis that intersects the surface at a respective position wherein each light source is configured to illuminate articles placed on the surface, and a system comprising one or more data processing apparatus, the system configured to, for each of a plurality of articles, perform operations comprising: reading the code of a respective one of the transports, the transport being separate from the surface, in response to reading the code, causing the image capture device to acquire an image of the article, associating the article with the code, the image, and one or more parameters that describe the respective article, and listing the article on an online store wherein the listing comprises the image of the article and one or more of the parameters.

These and other aspects can optionally include one or more of the following features. The operations can further comprise determining a price and a payout for the article based on, at least, the parameters, and associating the price and the payout with the article, wherein the listing further comprises the price of the article. The operations can further comprise cropping the image of the article based on a distance between the first and second positions and dimensions of the surface. The operations can further comprise removing artifacts that appear on the surface from the image. The parameters can comprise one or more of: gender, age, brand, size, category, material type, inseam, skirt length, patent cut, waist style, shoe style, bag style, and a description of a flaw. An article can be an article of clothing, a bag, an accessory, or shoes. The surface can be a plane. The surface can be a three-dimensional form resembling a human torso. The machine-readable code can be a one or more of a two-dimensional bar code, a three-dimensional bar code, a quick response code, a radio-frequency identification tag, and one or more symbols. The aspect can further comprise a conveyance configured to convey transports from a first location where the surface is located to a second location. The aspect can further comprise determining a size of the article based on a distance between the first and second positions. The article can be an article of clothing, and a size of the article can be sleeve length, waist size, chest size, pant leg length, or pant inseam length.

In general, another aspect of the subject matter described in this specification can be embodied in a studio arrangement comprising a plurality of paths having a common termination point wherein none of the paths are parallel to another, a plurality of forms each comprising a respective conveyance that is slidably engaged with a different one of the paths such that each form can slide along the path to the termination point, a background comprising a white surface, the background located behind the termination point, an image capture device located at a first position on an axis that intersects a form at a second position when the form is positioned at the termination point, and one or more light sources each aimed at the background and positioned in front of the termination point.

These and other aspects can optionally include one or more of the following features. The image capture device can be located behind the light sources. Each path can comprise a respective raised rail. Each path can comprise a respective channel. Each conveyance can comprise a receptacle for the rail. A particular form can be a mannequin or a dress form. Each path can comprise a respective suspended rail. A particular path can be straight. At least two of the paths can form an angle at the termination point that is less than 45 degrees.

In general, yet another aspect of the subject matter described in this specification can be embodied in methods that include the actions of receiving, from an image capture device, a first image of an article and a background surface, the background surface being illuminated by one or more light sources, generating a grayscale image from the first image, determining a brightness level of the article in the grayscale image based on a first luminous intensity representing the background surface, determining one or more control parameters for the image capture device based on the brightness level of the article, and sending the control parameters to the image capture device, causing the image capture device to configure, for capturing a second image of the article, one or more settings based on the control parameters. Receiving, generating, determining, and sending can be performed by one or more computer processors. Other embodiments of this aspect include corresponding systems, apparatus, and computer programs.

These and other aspects can optionally include one or more of the following features. The aspect can further comprise receiving, from the image capture device, the second image of the article, identifying an outline of the article in the second image, and creating a third image by, based on the brightness level of the article, replacing one or more pixels in the second image that are outside the outline with one or more background pixels representing a specific background for the article in the third image. Determining a brightness level of the article in the grayscale image based on a first luminous intensity representing the background surface can comprise determining, in the gray scale image, a number of particular pixels that each has a second luminous intensity being within least a specified threshold from the first luminous intensity, and determining a brightness level of the article based on a ratio between the number of the particular pixels and a total number of pixels in the grayscale image. The grayscale image can have an area smaller than the first image's area. A particular control parameter can be configured to adjust one or more settings in sensitivity, exposure time, focal length, or aperture size. The first image can be a still image of a current live view of the image capture device.

Particular implementations of the subject matter described in this specification can be implemented to realize one or more of the following advantages. The studio arrangement described herein includes a plurality of article transports, each transport having a respective machine-readable code for tracking a respective article. The studio arrangement also includes an image capture device for capturing images of an article placed on a surface and illuminated by one or more light sources. The studio arrangement also includes a computer system for automatically cataloging articles. An operator can initiate cataloging a particular article by placing the article on the surface and scan a transport's code using a code reader. The computer system reads the code scanned by the operator and causes the image capture device to acquire an image of the article. The computer system can create a catalog entry for the article by associating the article with the code, the image and parameters describing the article, and list the article on an online store based on the catalog entry.

The other studio arrangement described herein includes a plurality of paths having a common termination point wherein none of the paths are parallel to another. The studio arrangement includes a plurality of mannequins each comprising a conveyance that is slidably engaged with a different one of the paths. The studio arrangement also includes a background behind the termination point, an image capture device positioned in front of the common termination point and pointing to a mannequin positioned at the termination point, and one or more light sources each aimed at the background and positioned in front of the common termination point. In the studio arrangement, a mannequin can be positioned at the common termination point for image capturing by the image capture device. When a mannequin is not in use for image capturing, the mannequin can be slid along its respective path away from the common termination point and thus out of sight of the image capture device.

The system described herein improves image quality of a photograph of an article and a background surface taken by a camera by automatically setting control parameters of the camera based on contrast between the article and the background surface. The system receives, from the camera, a first image of a live view of the article and the background surface, and generates a grayscale image from the first image. The system determines a brightness level of the article in the grayscale image based on a first luminous intensity representing the background surface. The system determines one or more control parameters for the camera based on the brightness level of the article. The system sends the control parameters to the camera, causing the camera to configure, for taking a photograph of the article, one or more settings based on the control parameters.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Particular implementations of the subject matter described in this specification describe a studio for merchandising clothing. The studio includes arrangements and systems for photographing and cataloging clothing items, as further described below.

Figure 1:
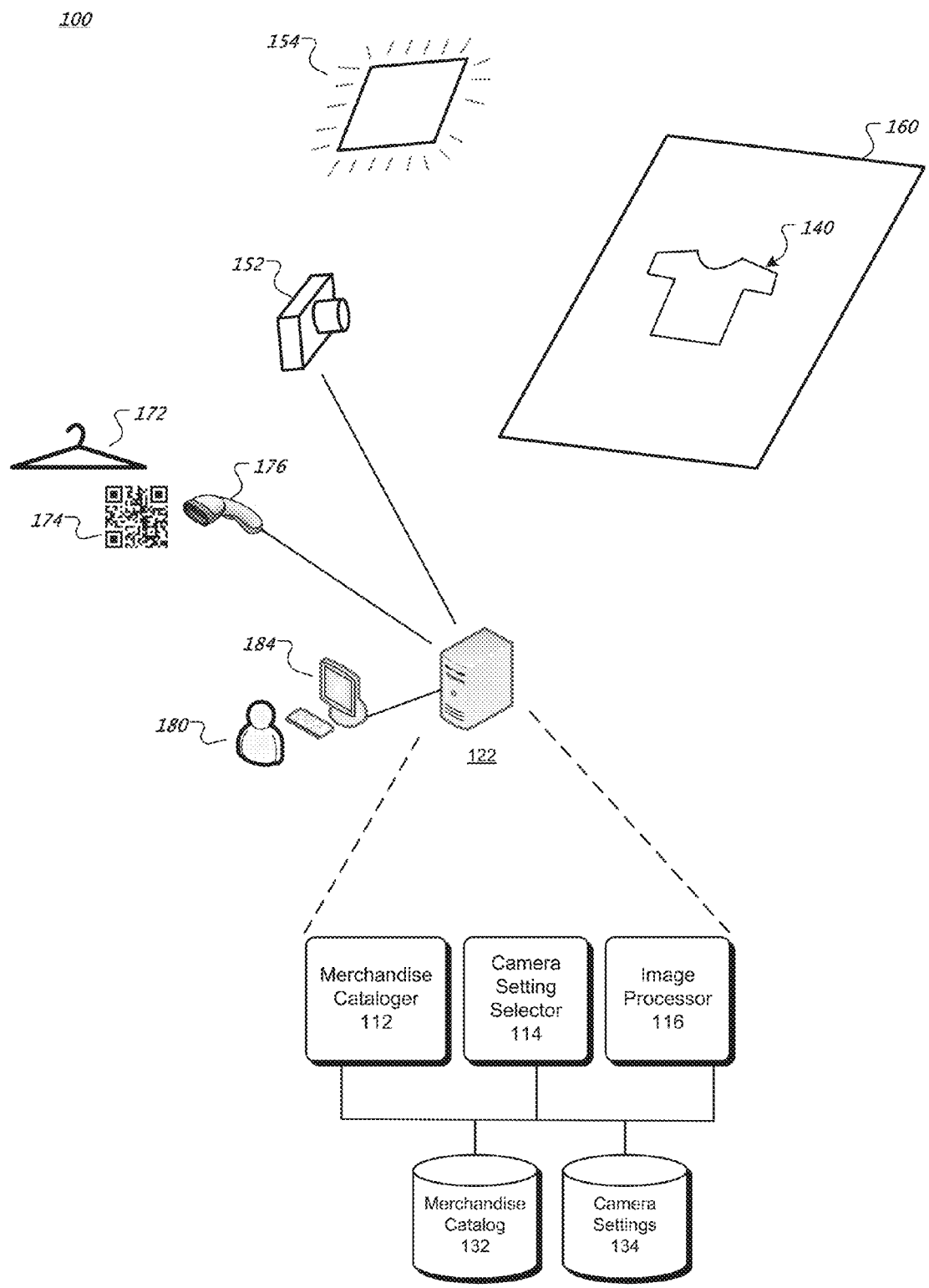
FIG. 1 illustrates an example studio arrangement for merchandising clothing articles.

FIG. 1 illustrates an example studio arrangement 100 for merchandising clothing articles. The studio 100 comprises an image capture device 152 for capturing images of an article 140. The image capture device 152 can be a camera, camcorder, a video camera that can capture still or moving images. Other types of image capture devices are possible. The article 140 is an object that can be photographed. An article 140 can be, for example, an article of clothing, a bag or purse, shoes, or an accessory (e.g., a necklace, scarf). The article 140 can be placed on a surface 160. The surface 160 can be a flat or curved surface. The surface 160 can be of white color. Other colors of the surface 160 are possible.

A light source 154 illuminates the article 140 for image capturing by the image capture device 152. The light source 154 can comprise one or more light bulbs, light tubes, or light-emitting diode (LED) light panels. Other types of light sources 154 are possible. Additional light sources can be used to illuminate the article 140.

The studio arrangement 100 has a plurality of article transports for transporting and tracking articles. An article transport can be a cloth hanger, box, or bag. Other examples of an article transport are possible. More particularly, the article transport 172 is associated with a machine-readable code 174 for tracking an article carried by the article transport 172. For instance, the machine-readable code 174 can be a two or three-dimensional bar code, a quick-access (QR) code, or a radio-frequency identification tag that is attached to (or integrated with) the article transport 172. Other types of machine-readable codes are possible. The machine-readable code 174 can be read by a reader 175, such as a barcode reader or a radio-frequency identifier reader. After one or more images are taken of the article 140 by the image capture device 152, the article 140 can be placed on or in an article transport 172. The article 140 together with the article transport 172 then can be stored in a warehouse, for example. In some implementations, article transports can be moved to a warehouse with their own transporting mechanism such as using a cart, or a hanging track leading to the warehouse.

A computer system 122 provides functionality for cataloging clothing articles. The computer system 122 comprises one or more data processing apparatus, software components that execute on the data processing apparatus, and databases that can be deployed at the same or different geographic locations, for example. The computer system 122 software components comprise a merchandise cataloger 112, camera setting selector 114, and image processor 116. The software components can comprise subcomponents that can execute on the same or on different individual data processing apparatus. The computer system 122 databases comprise a merchandise catalog database 132 and camera settings database 134. The databases can reside in one or more physical storage systems. The software components and data will be further described below.

In the studio arrangement 100 of FIG. 1, the image capture device 152 can communicate with the computer system 122 through a wired connection (e.g., based on Universal Serial Bus or USB protocol) or a wireless connection (e.g., based on Bluetooth or Wi-Fi protocol). Similarly, the reader 176 can communicate with the computer system 122 through a wired or wireless connection. The computer system 122 can access functionalities of the image capture device 152 and the reader 176 via one or more software components, such as a device driver or an application program interface (API).

A user 180 (e.g., an operator of the studio) can access the computer system 122 through user interface devices 184 such as a display and a keyboard or a microphone. Other user interface devices are possible.

Figure 2:
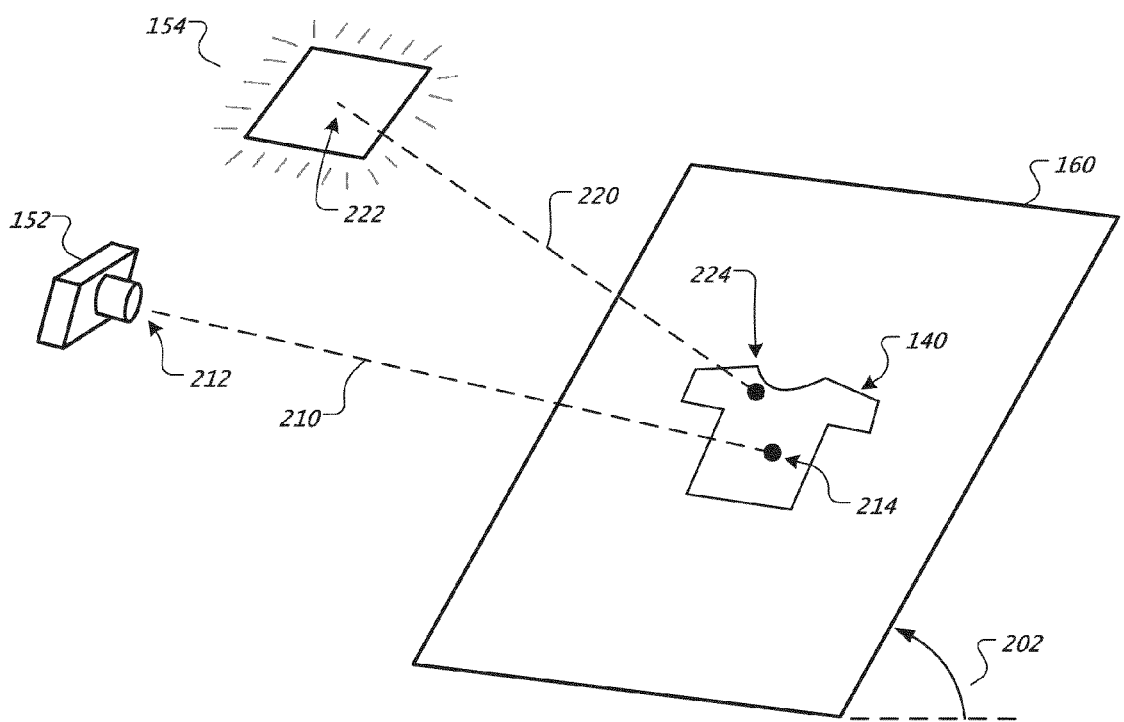
FIGS. 2 and 3 illustrate an example arrangement for image capturing in a studio for merchandising clothing articles.
Figure 3:
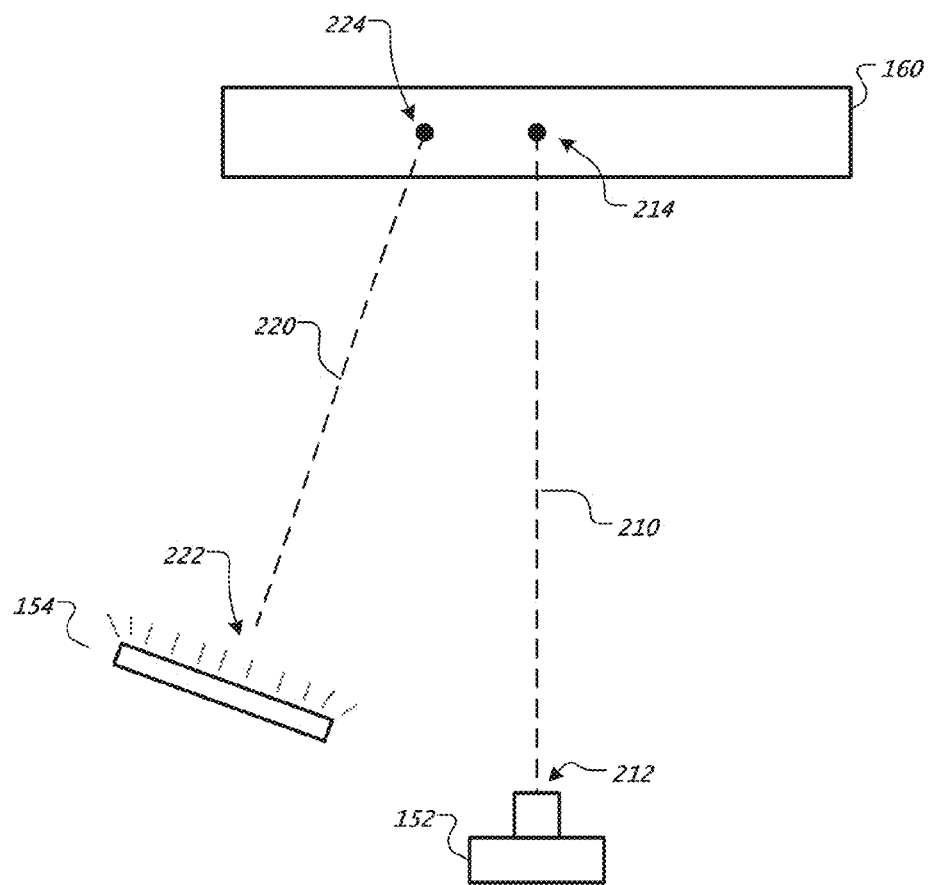

FIGS. 2 and 3 illustrate an example studio arrangement 200 for image capturing in the studio 100 illustrated in FIG. 1. FIG. 2 is a perspective view of the example arrangement for image capturing. In FIG. 2, the article 140 such as a T-shirt is placed on the surface 160. The surface 160 can be arranged at an oblique angle 202 from the ground, for example. In this way, the T-shirt can be placed in a position similarly as draped on a person, while the inclined surface 160 can provide enough friction for holding the T-shirt in place for image capturing.

The image capture device 152 can point to the surface 160 along an axis 210 at a position 212, for example. The axis 210 intersects the surface 160 at a position 214. The light source 154 can point to the surface 160 along an axis 220 at a position 222, for example. The axis 220 intersects the surface 160 at a position 224. The position 214 and 224 can be at the same or different locations on the surface 160. One or more additional light sources can point to the surface 160 along respective axes that intersect with the surface 160 at respective positions.

FIG. 3 is a top view of the example arrangement 200 for image capturing as illustrated in FIG. 2. As described in reference to FIG. 2, the image capture device can point to the surface 160 along the axis 210. The light source 154 can point to the surface 160 along the axis 220. Here, the light source 154 and the image capture device 152 are at the same side (in front of) the surface 160. The axis 220 can be at an oblique angle to the axis 210, for example. In other implementations, the axis 220 can be in parallel to the axis 210. The light source 154 can be closer to or farther away from the surface 160 as compared to the image capture device 152.

Figure 4:
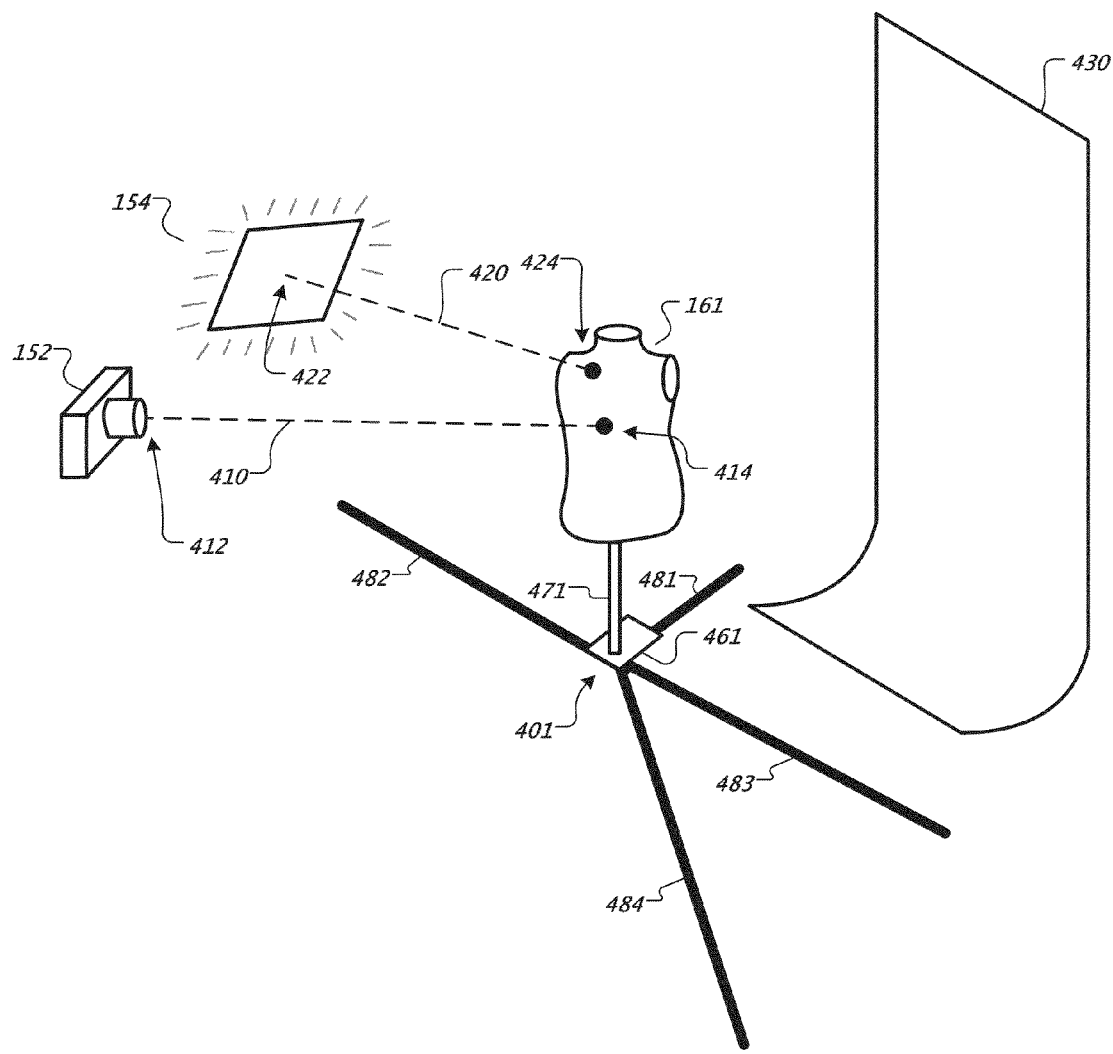
FIGS. 4 and 5 illustrate another example arrangement for image capturing using a mannequin in a studio for merchandising clothing articles.
Figure 5:
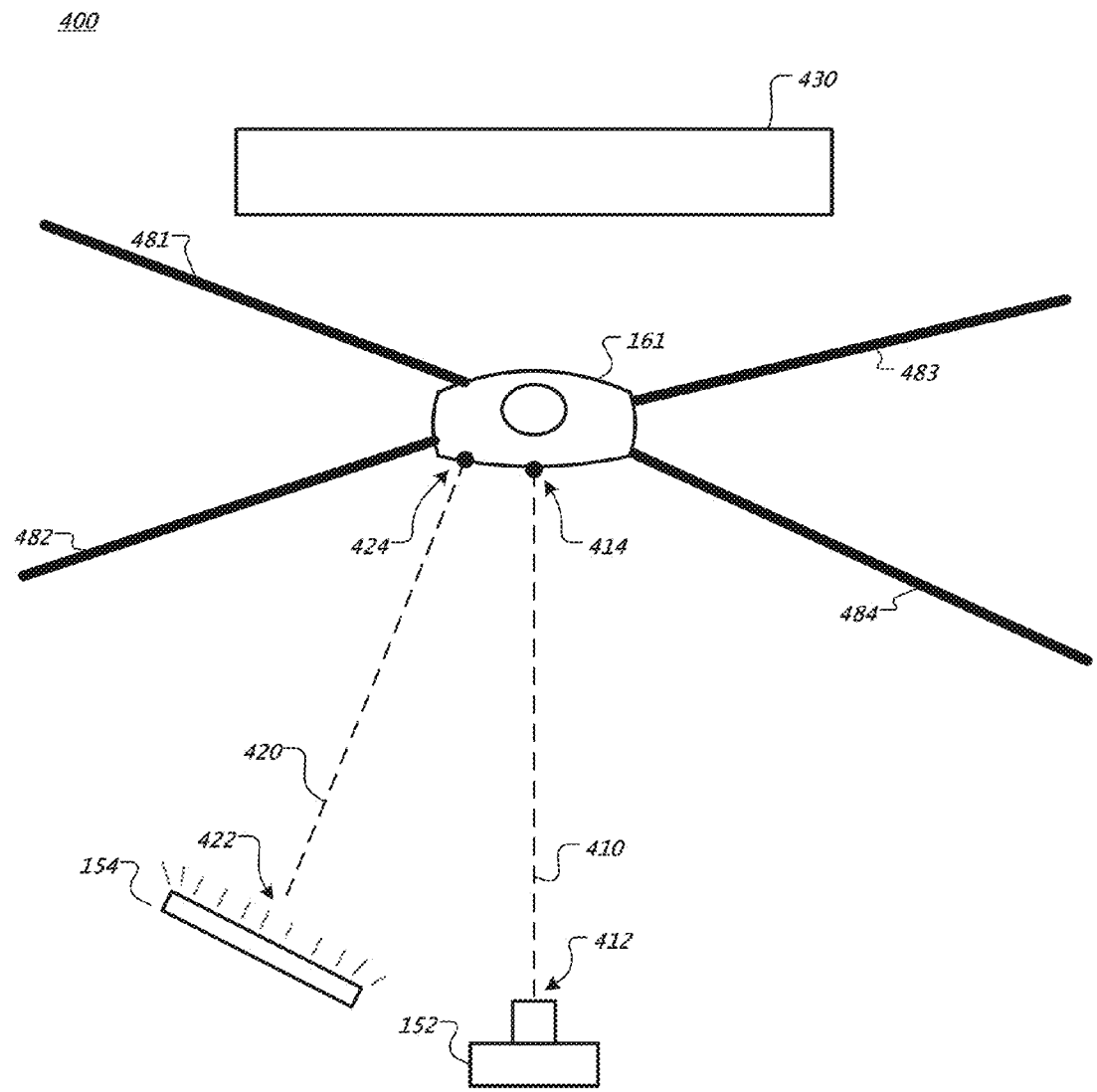

FIGS. 4 and 5 illustrate another example studio arrangement 400 for image capturing using a mannequin in the studio arrangement 100 illustrated in FIG. 1. FIG. 4 is a perspective view of the studio arrangement 100 using a form. Different types of forms are possible such as, for example, a mannequin, a dress form, or a form that does not resemble a portion of a human body. A form 161 has a three-dimensional surface that resembles a human or a particular part of a human body (e.g., a head, hand, arm, shoulder, upper body, lower body). In one implementation, the form 161 can be a cloth hanger. The article 140 can be placed on the form 161 for image capturing. For instance, a dress can be draped over the form 161 for image capturing. By way of further illustration, a bag can be hung on a shoulder of the form 161 for image capturing.

The image capture device 152 can point to the form 161 along an axis 410 at a position 412, for example. The axis 410 intersects the form 161 at a position 414 (or at another position on the form 161). The light source 154 can point to the form 161 along an axis 420 at a position 422, for example. The axis 420 intersects the form 161 at a position 424. The position 414 and 424 can be at the same or different locations on the form 161. One or more additional light sources can point to the form 161 along respective axes that intersect with the mannequin 161 at respective positions.

FIG. 5 is a top view of the example studio arrangement 400. As described in reference to FIG. 4, the image capture devices 152 can point to the form 161 along the axis 410. The light source 154 can point to the form 161 along the axis 420. Here, the light source 154 and the image capture device 152 are at the same side (e.g., in front of) of the form 161. The axis 420 can be at an oblique angle to the axis 410, for example. In some implementations, the axis 420 is in parallel to the axis 410. The light source 154 can be closer to or farther away from the form 161 as compared to the image capture device 152.

As illustrated in FIGS. 4 and 5, a background surface 430 can provide a background for capturing images of the article 140 on the form 161. The background surface 430 can have the same or different color as the form 161. For instance, both background surface 430 and the form 161 can have white color. Other combinations of colors of the form 161 and the background surface 430 are possible. The background surface 430 can be placed behind of the form 161 opposite to the image capture device 152 and one or more light sources such as the light source 154. The light sources can aim, directly or indirectly, at the background surface 430.

In some implementations, a person (a human model) can be in place of the form 161 for image capturing in the example studio arrangement illustrated in FIGS. 4 and 5.

As illustrated in FIG. 4, the form 161 can be coupled to a conveyance 461. In some implementations, the form 161 is coupled to the conveyance 461 by way of a support 471 (e.g., a pole). The conveyance 461 is integrated with the form 161. In further implementations, the form 161 can be rotatable on the support 471 such that an appropriate side of the form can face the image capture device 152. For instance, with a dress draped over the form 161, photographs can be taken for both front and back sides of the dress by rotating the form 161. Or a video clip can be taken for the dress while the form 161 rotating for 360 degrees.

In some implementations, the conveyance 461 is moveable along a path 481 such as a track or a channel. Other types of paths are possible. For image capturing by the image capture device 152, the form 161 is moved using the conveyance in front of the image capture device 152 (i.e., intersecting the axis 410), to a termination point 401 of the path 481. When the form 161 is not used for image capturing by the image capture device 152, the form 161 can be moved using the conveyance toward another end of the path 481. In this way, the form 161 can be "out of sight" of the image capture device 152 when the form 161 is not in use for image capturing. In some implementations movement of the form using a conveyance can be performed manually by a person pushing or pulling the form which causes the conveyance to travel along a path in the direction of the force. In further implementations the conveyance is motorized and can automatically move the form. In yet further implementations, the path has an apparatus (e.g., a cable or an internal conveyance) that couples with the conveyance and can automatically move the conveyance to a given position.

Figure 6:
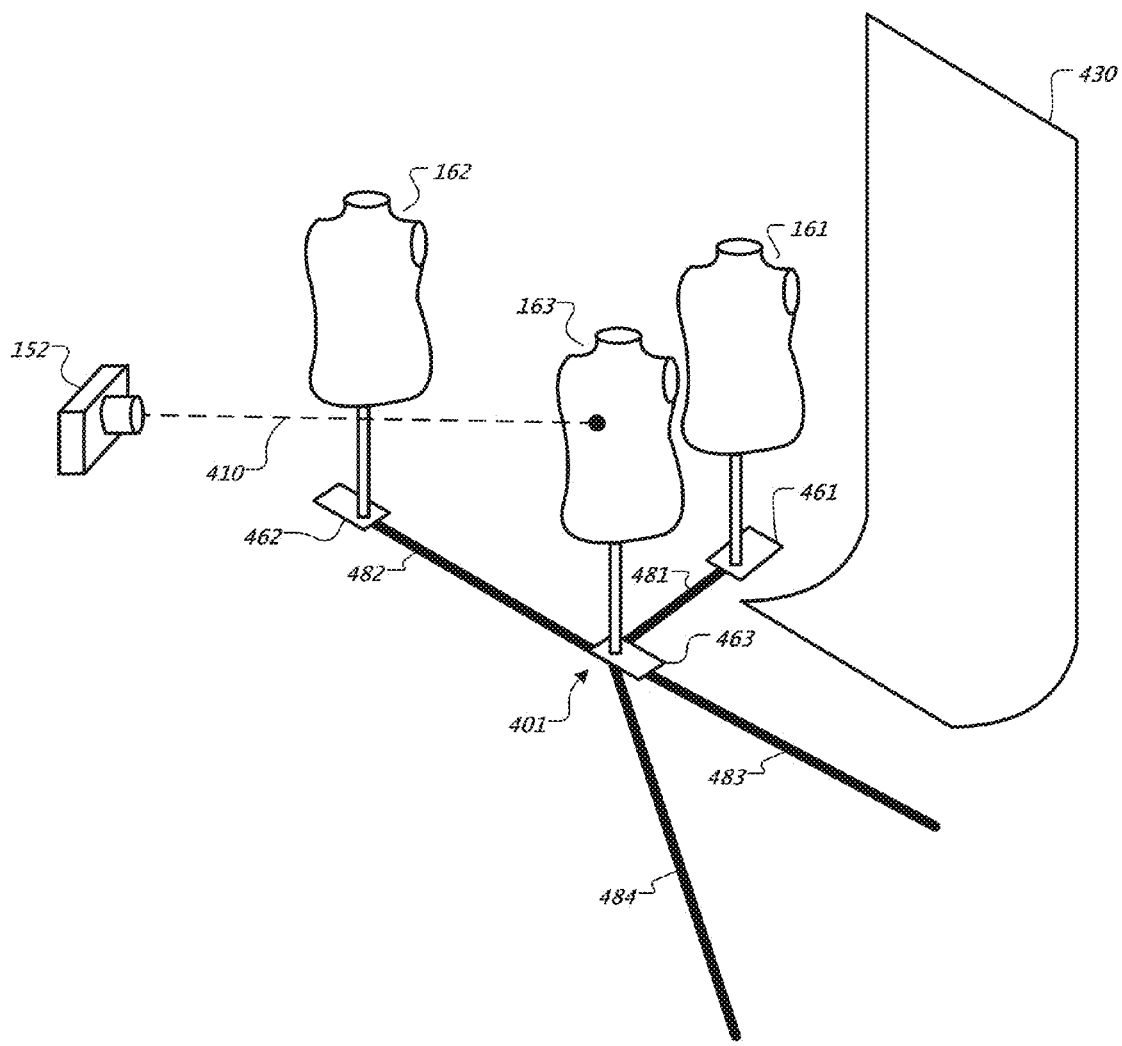
FIG. 6 illustrates an example arrangement for image capturing using multiple paths conveying multiple mannequins in a studio for merchandising clothing articles.

In various implementations, the studio can have multiple paths conveying multiple forms, each path can be used by a respective conveyance 461. FIG. 6 illustrates an example studio arrangement 600 for image capturing using multiple paths for conveying multiple forms in the studio illustrated in FIG. 1. As illustrated in FIG. 6, the path 481 can convey the form 161, the path 482 can convey the form 162, and the path 483 can convey the form 163, and so on. Each form is coupled to a respective conveyance (e.g., 461, 462, 463) that is itself engaged with a respective path. The paths 481, 482, 483, and 484 can have a common termination point 401. In one implementation, none of the paths 481, 482, 483, and 484 is parallel to another path. In further implementations, at least two of the paths are collinear with each other. As illustrated in FIG. 6, the form 163 is moved along the path 483 to the common termination point 401, for image capturing by the image capture device 152. Note that the form 163 intersects the axis 410—i.e., the form 163 is "within sight" of the image capture device 152. Meanwhile, the form 161 can be moved along the path 481, away from the termination point 401 (i.e., out of sight of the image capture device 152), when the form 161 is not in use for image capturing by the image capture device 152. The form 162 can be moved along the path 482, away from the termination point 401, when the form 162 is not in use for image capturing by the image capture device 152. In this way, an operator of the studio can use the form 161 or 162 as a staging area for placing an article on the form or removing an article from the form.

Figure 7A:
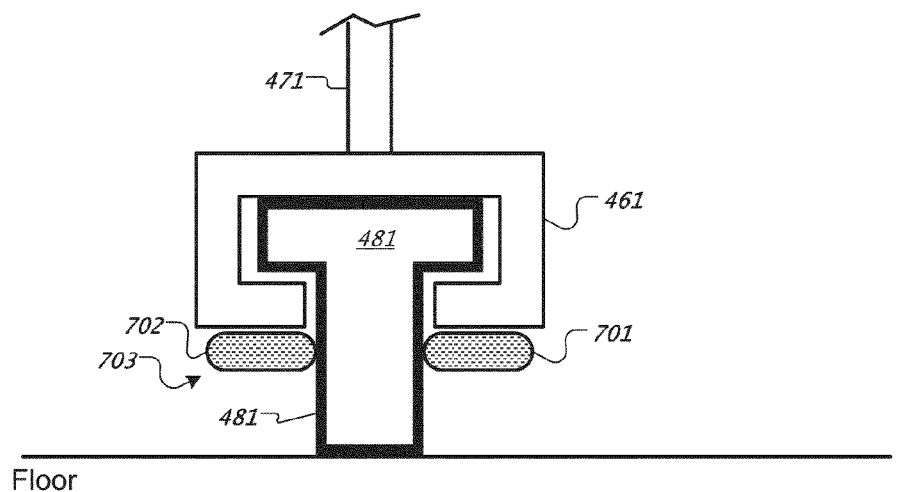
FIGS. 7A and 7B illustrate an example conveyance supporting a mannequin.
Figure 7B:
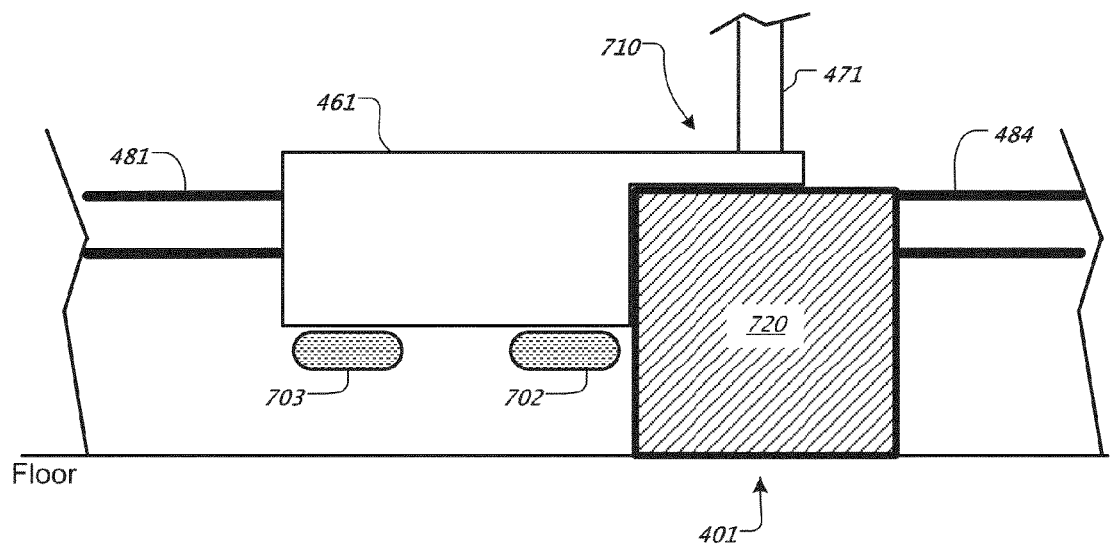

FIGS. 7A and 7B illustrate an example conveyance for supporting a form. FIG. 7A is a cross-sectional view of the conveyance 461. FIG. 7B is a side view of the conveyance 461. As illustrated in FIGS. 7A and 7B, the rails (e.g., 481, 484) are raised above the floor. The conveyance can comprise a receptacle that wraps around a path comprising a rail. The rail can have various shapes including a "T" shape, "I" shape, and "U" shape, for example. Other rail shapes are possible. In some implementations the rail is raised above the studio floor and in other implementations the rail is embedded in the studio floor. In further implementations, the rail is attached to the studio ceiling or embedded in the studio ceiling. The conveyance 461 can include rolling conveyances such as wheels (e.g., 701, 702, 703) that are slide-ably engaged with the path 481, for example. In some implementations a wheel is implemented as one or more ball bearings. A block 720 can be placed at the common termination point 401 of the paths that can stop each conveyance at the common termination point 401. The conveyance 461 can have an extension portion 701 such that the form 161 can be positioned at the common termination point 401.

Figure 8:
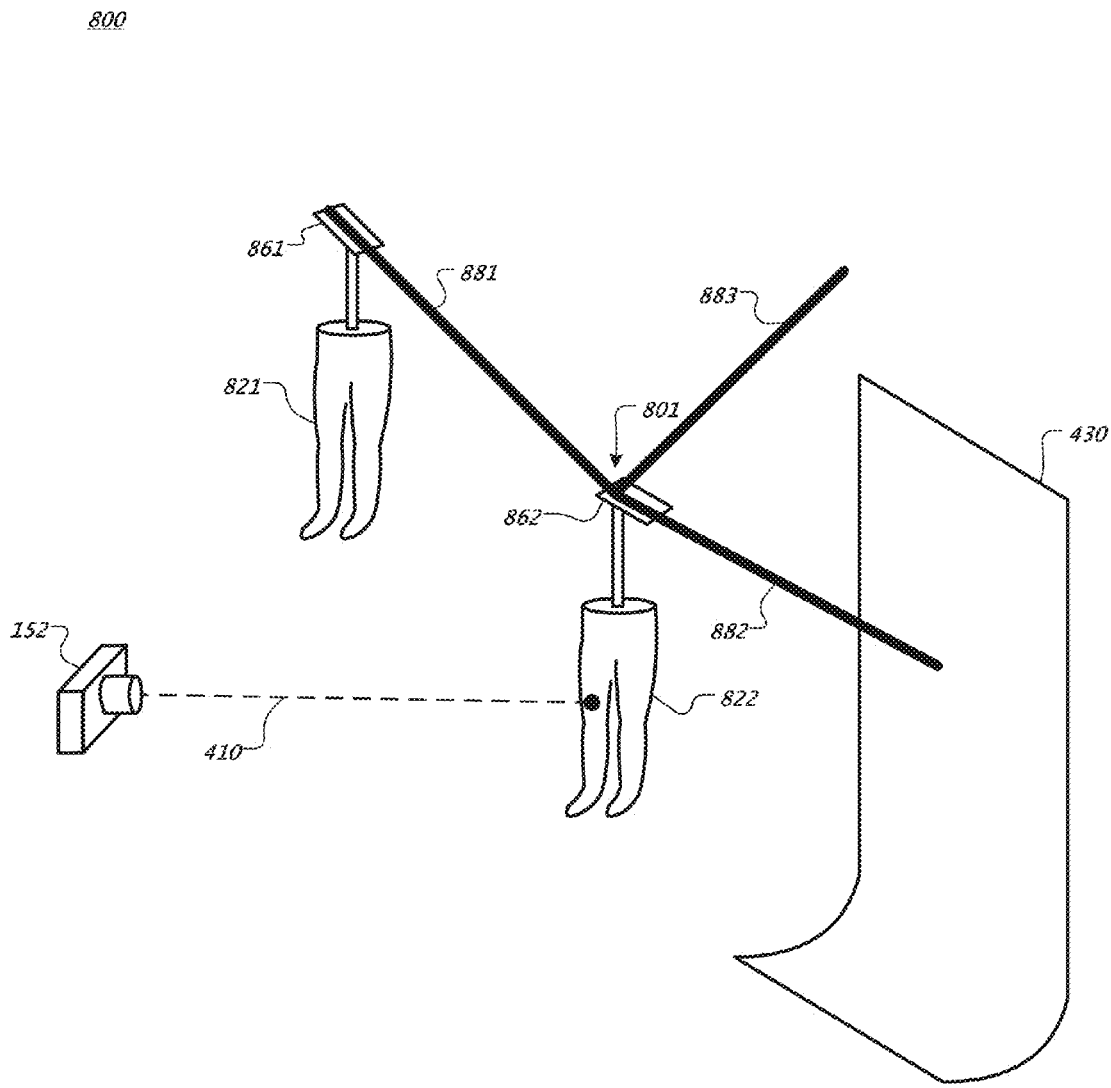
FIG. 8 illustrates an example arrangement for image capturing using multiple suspended rails conveying multiple mannequins in a studio for merchandising clothing articles.

In FIGS. 4, 5, 6, 7A, and 7B, the paths are placed at a floor of the studio. Other placements of paths supporting forms are possible. For instance, the paths can be suspended rails placed on or near a ceiling of the studio. FIG. 8 illustrates an example arrangement for image capturing using multiple suspended rails conveying multiple mannequins in a studio for merchandising clothing articles. As illustrated in FIG. 8, the suspended rail 881 can convey the form 821, the suspended rail 882 can convey the form 822, and so on. Each form is suspended to a respective conveyance (e.g., 861, 862) that is itself engaged with a respective suspended rail. The suspended rails 881, 882, and 883 can have a common termination point 801. A form (e.g., 822) can be moved (along the corresponding suspended rail 882) to the common termination point 801 between a background (e.g., the background surface 430) and the image capture device 152 for image capturing, and moved away from the common termination point 801 when not in use for image capturing. A form can be a pant mannequin, for example. A pant mannequin suspended from its respective suspended rail can be more convenient for an operator to place a pant or skirt over the mannequin, without the interference of an underlying pole such as the pole 471 illustrated in FIG. 4.

The user 180 can place the article 140 on the surface 160 or on the form 161, and use the image capture device 152 and the computer system 122 to automatically photograph and catalog the article 140. The user can initiate photographing and cataloging the article 140 by obtaining the article transport 172 (for the article 140), and scanning the machine-readable code 174 with the reader 176, as further described below in reference to FIG. 9.

Figure 9:
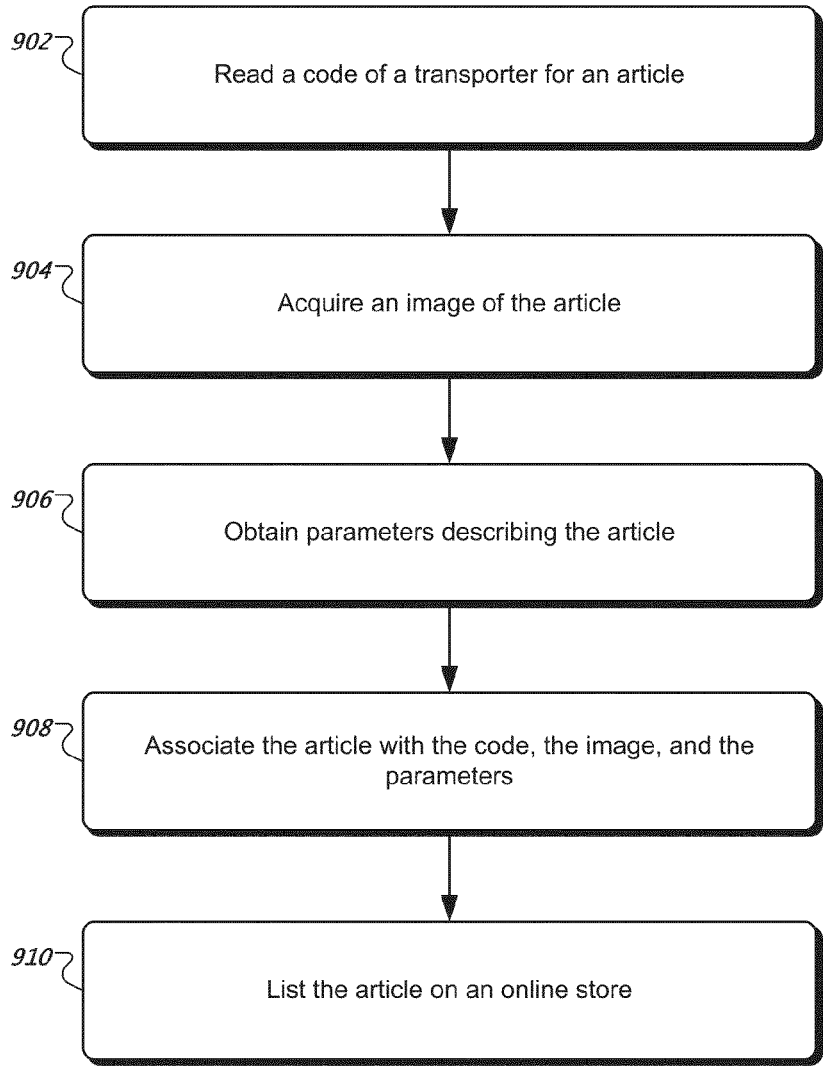
FIG. 9 is a flowchart of an example method for merchandising a clothing article.

FIG. 9 is a flow chart of an example method for merchandising the article 140. The method can be implemented using the studio arrangements and the software components executing on one or more data processing apparatus that are part of the computer system 122 described earlier. The method starts by reading the machine-readable code 174 of the article transport 172 for the article 140 (902). For instance, the merchandise cataloger 112 can obtain the code 174 via a device driver of the reader 176, when the user 180 scans the code 174 with the reader 176. Here, the transport 172 is separated from the surface 160. In response to reading the code 174, the merchandise cataloger 112 can access the image capture device 152, and cause the image capture device 152 to acquire an image (e.g., a photograph, or a video clip) of the article 140 (904). If the user 180 wants to take another image of the article 140, the user 180 can use the reader 176 to scan the code 174 again, causing the image capture device 152 to take another image of the article 140 and provide the image to the merchandise cataloger 112.

The merchandise cataloger 112 can obtain parameters describing the article 140, for example, from the user 180 via the user interface devices 184 (906). For instance, the user 180 can inspect the article 140 and input parameters describing the article 140 including, among other things, brand, gender, size, category (e.g., tops, bottoms, long sleeve, short sleeve, hat, shoes), material type (e.g., 100% cotton, 90% polyester/10% spandex), inseam length, skirt length, pant cut (e.g., straight, boot cut), waist style (e.g., on the waist, low), shoe style (e.g., boots, sneakers, sandals), bag style (e.g., hand bag, shoulder bag), dress style (e.g., formal gown, summer dress), or a description of a flaw (e.g., stains, holes, missing buttons).

The parameters describing the article 140 can also include a color of the article 140. The image processor 116 can determine a color of the article 140 by analyzing the image of the article 140, and provide the color to the merchandise cataloger 112. In addition, the image processor 116 can analyze the image of the article 140 and determine a size of the article 140 based on the distance between the image capture device 152 and the surface 160 (e.g., the distance between the positions 212 and 214 illustrated in FIG. 2). For instance, with the distance between the image capture device 152 and the surface 160 held at a particular value, the image processor 116 can analyze an image taken by the image capture device 152 and determine a length between two particular points in the image, for example, by using a ruler or other indicia placed on the surface 160 as a calibration. With the distance between the image capture device 152 and the surface 160 held at the particular value, the image processor 116 then can analyze an image of the article 140 (e.g., a shirt, a pair of pants) taken by the image capture device 152 and determine a size (length) of the article 140 such as sleeve length, waist size, chest size, pant leg length, or pant inseam length. The image processor 116 can perform additional image processing and analysis operations, as will be further described later.

The merchandise cataloger 112 can associate the article 140 with the code 174, the image, and the parameters describing the article 140 (908). For instance, the merchandise cataloger 112 can create a record (i.e., a catalog entry) including the code 174, the image, and the parameters describing the article 140, and store the record in the merchandise catalog database 132.

The merchandise cataloger 112 can also determine a price for the article 140 based on, at least, the parameters describing the article 140. For instance, the computer system 122 can store in the merchandise catalog database 132 one or more pricing tables. A pricing table can include brand tiers. Each tier can include a number of brands and a reference price. Each tier can also include additional reference prices based on the parameters (attributes) describing an article such as material and styles. The merchandise cataloger 112 can determine a price for the article 140 by looking up the pricing tables based on the article's brand and one or more attributes, and include the price in the record for the article 140.

The article 140 may come from a consumer who wants to resale the article 140. The merchandise cataloger 112 can determine a payout amount to the consumer based on, at least, the parameters of the article 140. For instance, for a lower priced article (e.g., sandals, shorts, or an article with flows), the merchandise cataloger 112 can set a pre-determined amount (e.g., 50% of the price) as the payout to the consumer. For an expensive article (e.g., a formal gown), the merchandise cataloger 112 can designate the article as a consignment, and only provide a payout to the consumer when the article is sold.

After photographing and cataloging the article 140, the merchandise cataloger 112 (or another software component of the computer system 122) can list the article 140 on an online store (910). For instance, the merchandise catalog 112 can accessing the record of the article 140 stored in the merchandise catalog database 132 and create a web page for listing the article 140 for sale online. The listing can include the image and one or more of the parameters of the article 140.

Figure 10:
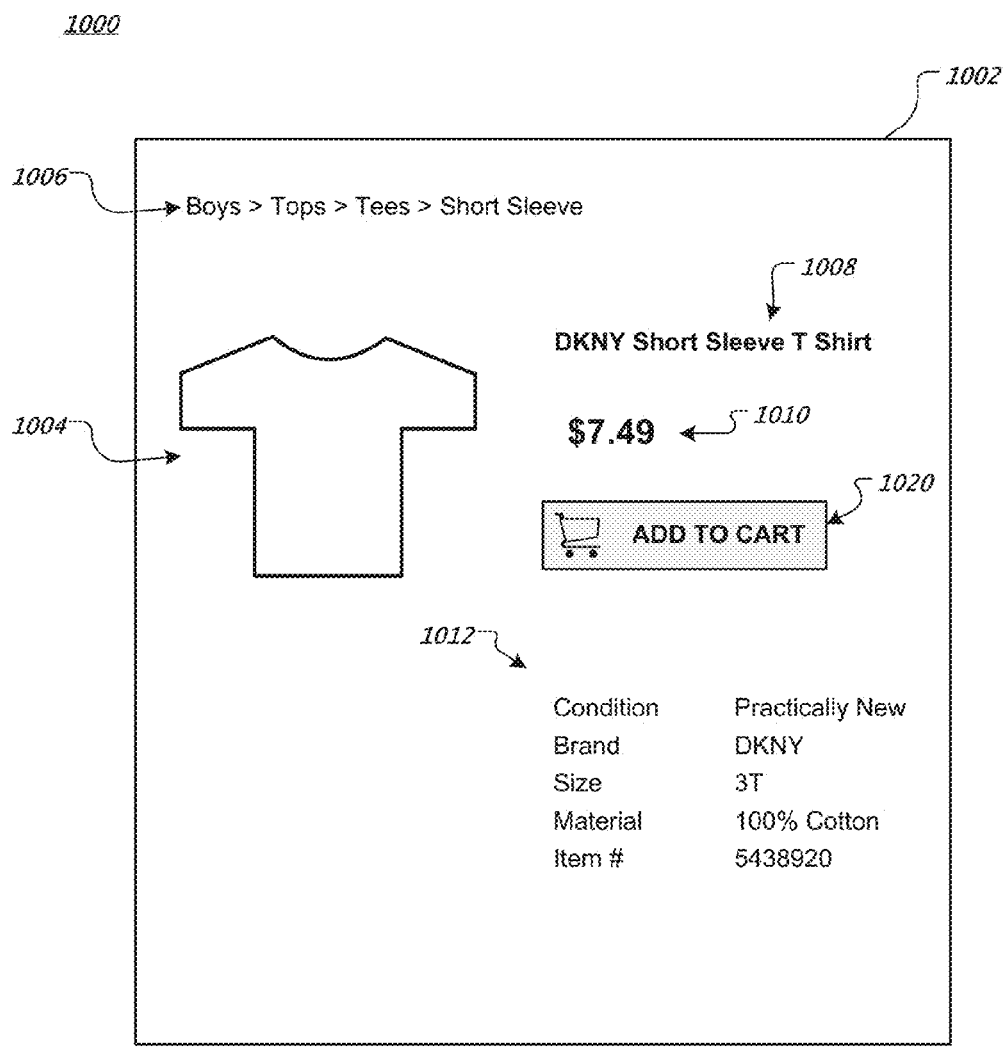
FIG. 10 is an example web page for listing a clothing article for sale online.

FIG. 10 is an example web page for listing the article 140 for sale online. The web page 1002 can include the image 1004 of the article 140, a category 1006, description 1008, price 1010, and additional parameters 1012. The web page also includes a selectable icon 1020 for purchasing the article 140.

Particular embodiments of the subject matter described in this specification include methods for improving quality of images taken for clothing articles. The methods can provide better image quality of a clothing article in a photograph taken by a camera by automatically adjusting the camera's setting before the photograph is taken, based on contrast between a clothing article and a background surface, as described below in reference to FIG. 11.

Figure 11:
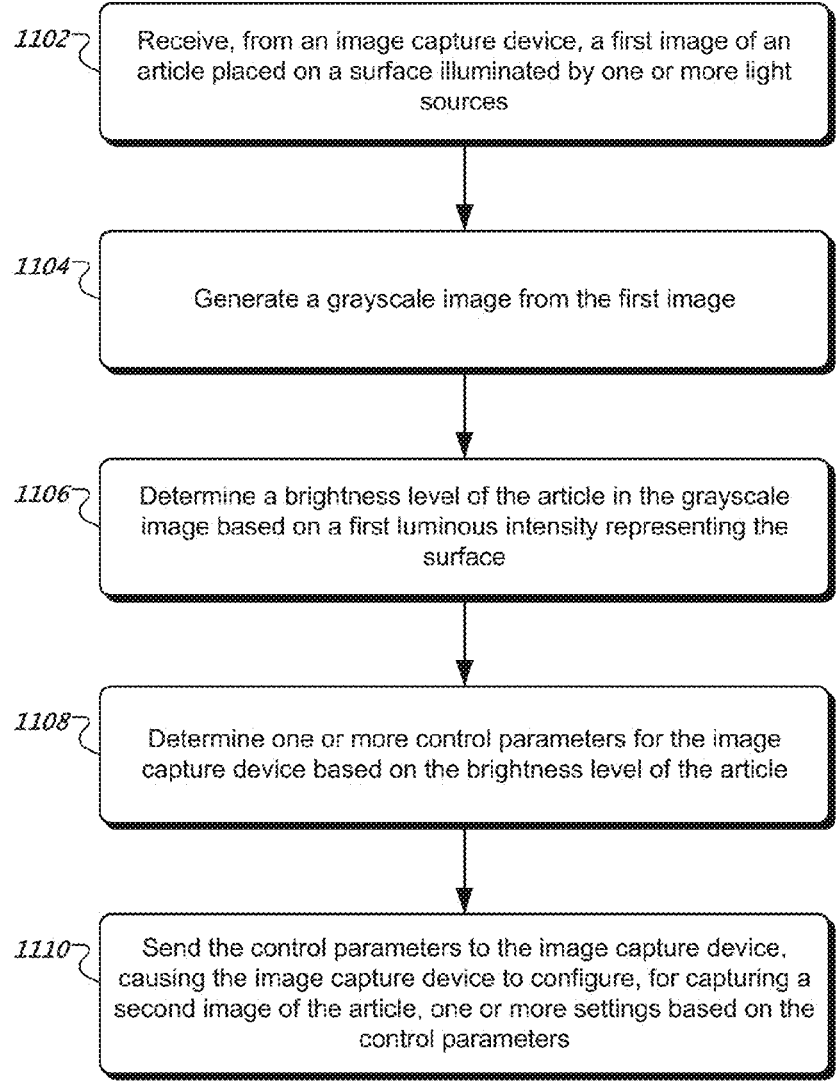
FIG. 11 is a flow chart of an example method for photographing a merchandise.

FIG. 11 is a flow chart of an example method for photographing a merchandise. The method can be implemented using the image capture device 152 and software components executing on one or more data processing apparatus that are part of the computer system 122 described earlier. The method starts when the image processor 116 receives, from the image capture device 152, a first image of the article 140 and a background surface, such as the surface 160 illustrated in FIG. 2 (1102). The background surface can also include the background surface 430 and the mannequin 161 illustrated in FIG. 4, when the article 140 is placed on the mannequin 161. As described earlier, the background surface is illuminated by one or more light sources such as the light source 154. The method can start when the user 180 scans the code 174 using the reader 176, for example.

Here, a digitized image can comprise an array of pixel elements or pixels. Each pixel can be represented by a primary color or Red-Green-Blue (RGB) triplet (r, g, b), for example. Each value of the triplet can have a range indicating the luminous intensity of a particular primary color. For instance, a value of 0 indicates zero intensity, while a value of 255 indicates maximal intensity. In a color image, the three values in an RGB triplet of a pixel can have different values. For instance, (0, 0, 128) can represent a blue shade ("navy blue"). (255, 105, 180) can represent a pink shade. In a grayscale image, the three values in an RGB triplet of a pixel have the same value. For instance, (255, 255, 255) can represent white color. (0, 0, 0) can represent black color. An equal-value RGB triplet between the white and black color such as (100, 100, 100) or (195, 195, 195) can represent a particular gray shade. In addition to the RGB color space above, pixels in a digitized image can be represented in other color spaces such as HSL (hue-saturation-lightness) color space and HSV (hue-saturation-value) color space. Pixel representation in one color space can be transformed to pixel representation in another color space such that the resulting image is as similar as possible to the original image.

The first image can be a still image of a current live view of the image capture device 154, for example. The first image can be a color image. The image processor 116 can generate a grayscale image from the first image (1104). The image processor 116 can generate a grayscale image form the first image (a color image) by converting each color pixel of the first image to a grayscale pixel. For instance, the image processor 116 can generate the grayscale image from the first image by using a bilateral filter such as Euclidean color filtering algorithm with a center color for the filtering being (200, 200, 200) in RGB (a light gray shade), and a filtering radius of 100.

Figure 12:
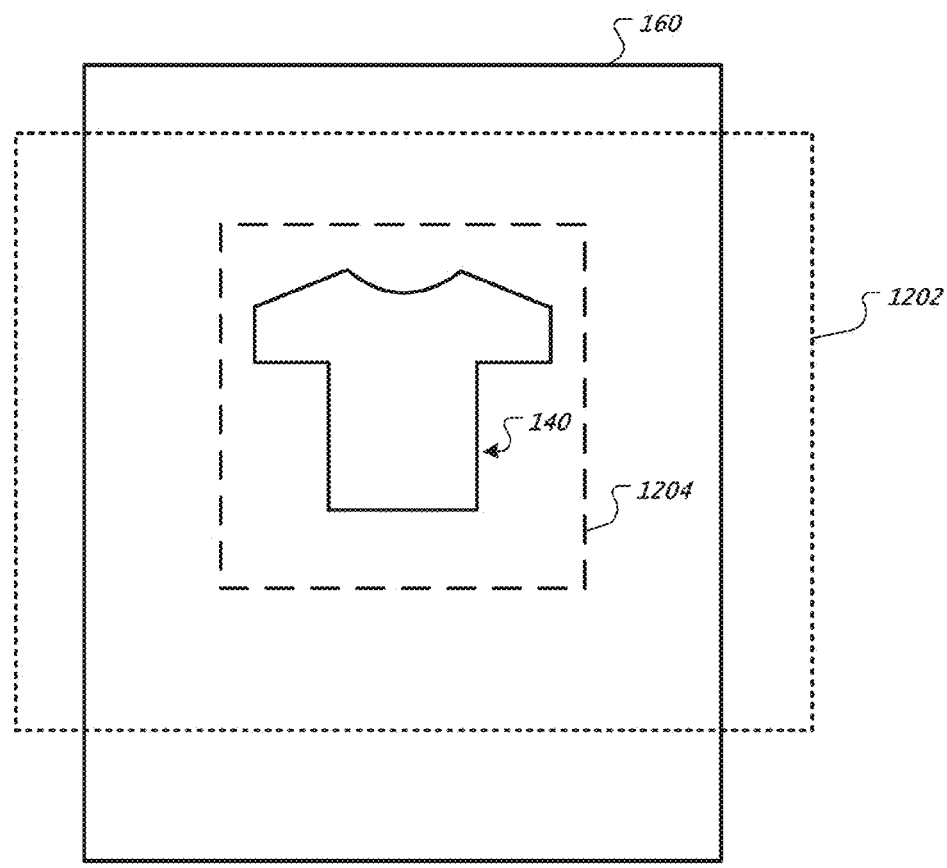
FIG. 12 illustrates an area of a camera's live view and another area including an article being photographed by the camera.

FIG. 12 illustrates an area of a camera's live view and another area including an article being photographed by the camera. As illustrated in FIG. 12, since the first image (a still image of a current live view of the image capture device 152) may have a wide angle, an area 1202 of the first image can be much bigger than the article 140 and include unnecessary or unrelated area (e.g., area further away from the article 140, or area outside the surface 160). The grayscale image can have an area 1204 smaller than the area 1202—i.e., by cropping the first image, but is sufficiently large to encompass the article 140 and a nearby portion of the surface 160. The image processor 116 can crop the first image based on a distance between positions 212 and 214 of the axis 210 and a size of the surface 160 illustrated in FIG. 2, for example. In this way, the article 140 will occupy a majority area in the grayscale image.

From the grayscale image, the image processor 116 can determine whether the article 140 is a dark object or a light object. Here, assuming the background surface is white, the image processor 116 can determine whether the article 140 is a dark or light object by determining a brightness level of the article 140 in the grayscale image based on a first luminous intensity representing the background surface (1106). For instance, the first luminous intensity representing the white background surface can be (255, 255, 255). The image processor 116 can determine a number of "bright" pixels in the grayscale image that each bright pixel has a respective luminous intensity being greater (brighter) than (10, 10, 10), or within (245, 245, 245) from the background surface's first luminous intensity (255, 255, 255). The image processor 116 can determine a brightness level (e.g., representing a dark object or a light object) of the article 140 based on a ratio of the number of bright pixels to the total number of pixels in the grayscale image. For instance, since the article 140 occupies a majority area of the grayscale image (as illustrated in FIG. 12), the image processor 116 can determine the article 140 is a light object if 95% of the pixels in the grayscale image are bright pixels. Otherwise, the image processor 116 can determine the article 140 is a dark object (or a "regular" object that can have enough contrast from the white background surface).

After determining the brightness level of the article 140, the image processor 115 can determine one or more control parameters for the image capture device 152 based on the brightness level of the article 140 (1108). The control parameters can include film or sensor sensitivity or a corresponding International Organization for Standardization (ISO) speed value, exposure time (or shutter speed), focal length, and aperture size (often referred as f-number). Other control parameters are possible. For instance, if the article 140 has a brightness level as a light object, the image processor 115 can set the control parameters for the image capture device 152 as follows:

IsoSpeed="1000"
ExposureProgram="Manual"
ExposureTime="1/125"
FocalLength="28/1"
FNumber="28/1"

If the article 140 has a brightness level as a dark object, the image processor 115 can set the control parameters for the image capture device 152 as follows:

IsoSpeed="400"
ExposureProgram="Manual"
ExposureTime="1/60"
FocalLength="28/1"
FNumber="28/5"

Note here the focal length can be fixed, as the distance between the image capture device 152 and the article 140 (e.g., the distance between positions 212 and 214) is already known in a given studio arrangement, such as the example arrangements illustrated in FIGS. 2-6.

The image processor 116 can send the control parameters to the image capture device 152.

Base on the received control parameters, the image capture device 152 adjusts corresponding settings, and captures a second image of the article 140 based on the settings (1110). Adjustments of the control parameters can control the amount of light reaching the image sensor (e.g., a complementary metal-oxide-semiconductor or CMOS image sensor) of the image capture device 152, and provide better image quality of a light object on the white background surface (e.g., with a correct representation of the white background surface and better sharpness and details of the light object). In this way, image quality of the article 140 can be optimized for the brightness level (a dark or light object) of the article 140 given the white background surface.

Furthermore, the image processor 116 can adjust the second image (received from the image capture device 152) to provide better contrasting background for the article 140. The image processor 116 can first crop the second image such that the remaining area encompasses the article 140 and a nearby portion of the surface 160 (e.g., the area 1204 illustrated in FIG. 12). The image processor 116 can determine a size the remaining area based on a distance between positions 212 and 214 of the axis 210 and a size of the surface 160 illustrated in FIG. 2, for example. The image processor 116 can then identify an outline of the article 140 in the second image, for example, by using an edge detection algorithm. The image processor 116 can create a third image by, based on the brightness level of the article 140, replacing pixels outside the outline of the article 140 in the second image with background pixels that represent a specific background in the third image. For instance, if the article 140 has a brightness level as a light object, the image processor 116 can fill the background in the third image with pixels with a light grade shade color—e.g., (225, 225, 225). If the article has a brightness level as a dark object, the image processor 116 can fill the background in the third image with white pixels—e.g., (255, 255, 255).

The image processor 116 can also remove artifacts (e.g., a stained spot, shadow) appearing in the third image by, for example, using an image smoothing algorithm (e.g., Gaussian smoothing).

The third image (a color image) then can be included in the record of the article 140 stored in the merchandise catalog database 132, and used for online listing as described earlier.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A studio arrangement comprising:
   a plurality of suspended paths having a common termination point and wherein at least two of the paths form an oblique angle at the termination point;
   a plurality of forms each comprising a respective conveyance that is slidably engaged with a different one of the paths such that each form can slide along the path to the termination point;
   a background comprising a white surface, the background located behind the termination point;
   an image capture device located at a first position on an axis that intersects a form at a second position when the form is positioned at the termination point; and
   one or more light sources each aimed at the background and positioned in front of the termination point.

2. The studio arrangement of claim 1 wherein the image capture device is located behind the light sources.

3. The studio arrangement of claim 1 wherein each path comprises a respective rail.

4. The studio arrangement of claim 1 wherein each path comprises a respective channel.

5. The studio arrangement of claim 3 wherein each conveyance comprises a receptacle for the rail.

6. The studio arrangement of claim 1 wherein a particular form is a mannequin or a dress form.

7. The studio arrangement of claim 1 wherein the particular form is a pant mannequin.

8. The studio arrangement of claim 1 wherein a particular path is straight.

9. The studio arrangement of claim 1 wherein at least two of the paths form an angle at the termination point that is less than 45 degrees.

10. The studio arrangement of claim 1 wherein none of the paths are parallel to each other.

* * * * *